Oct. 29, 1968
R. D. GIBBS
3,407,483
PROCESS FOR ACHIEVING DESIRED POSITIONS
OF ELECTRICAL COILS RELATIVE TO A
MAGNETIC CORE
Filed July 28, 1966
2 Sheets-Sheet 1
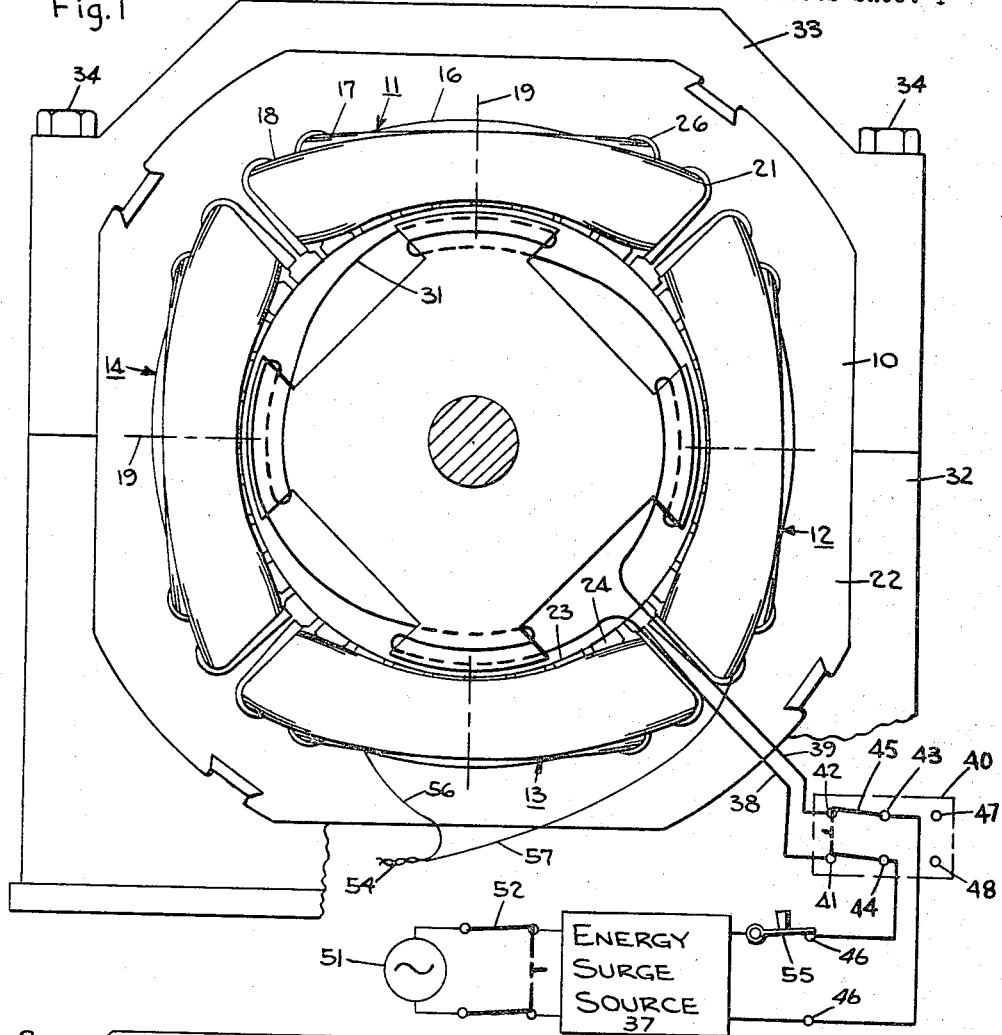
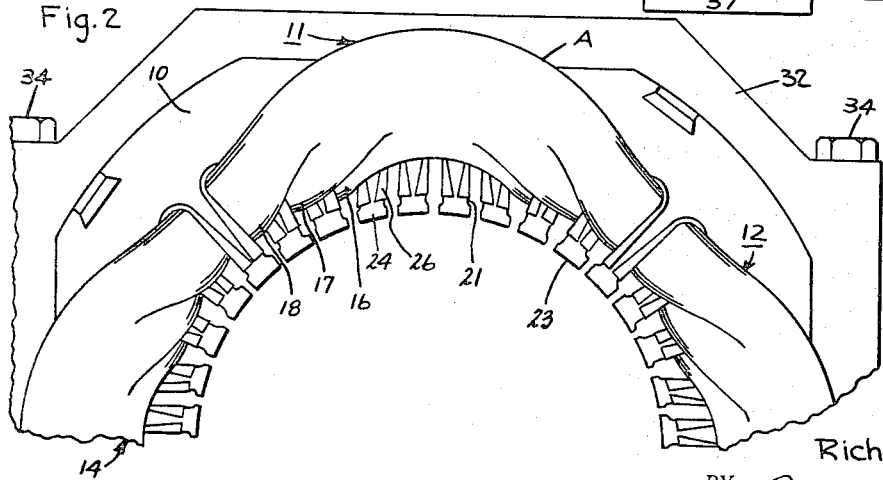
INVENTOR.
Richard D. Gibbs
BY John M. Stoudt
Attorney Oct. 29, 1968  R. D. GIBBS  3,407,483
PROCESS FOR ACHIEVING DESIRED POSITIONS
OF ELECTRICAL COILS RELATIVE TO A
MAGNETIC CORE
Filed July 28, 1966  2 Sheets-Sheet 2
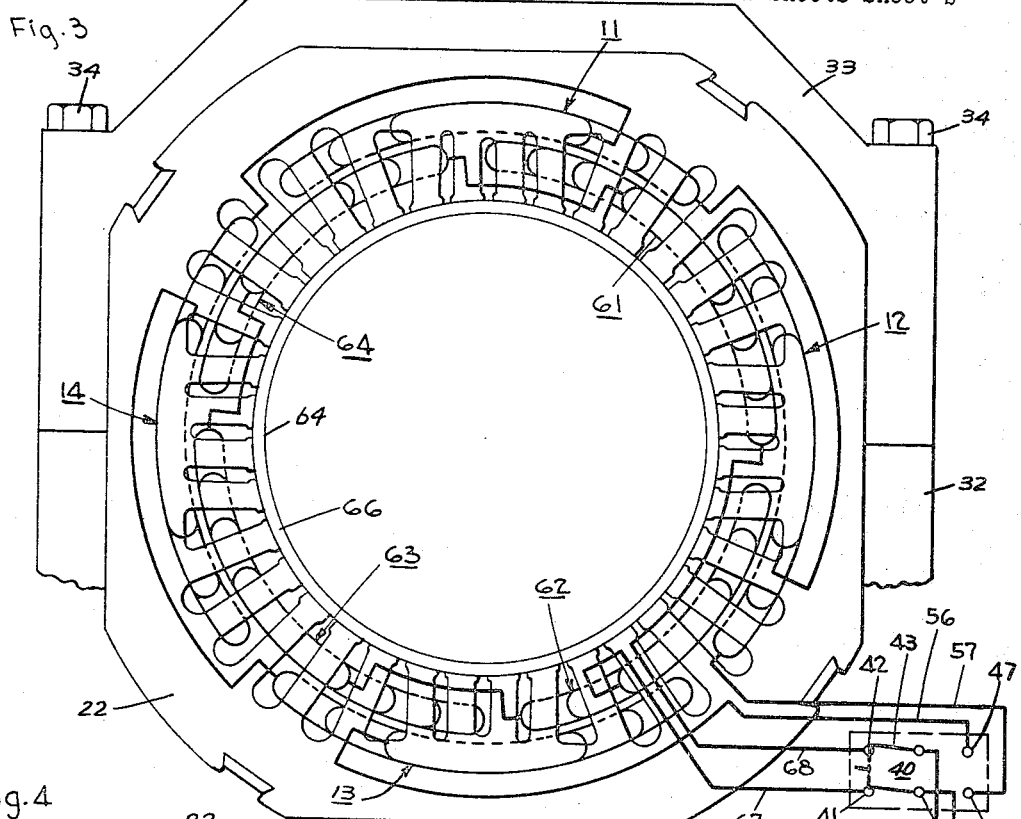
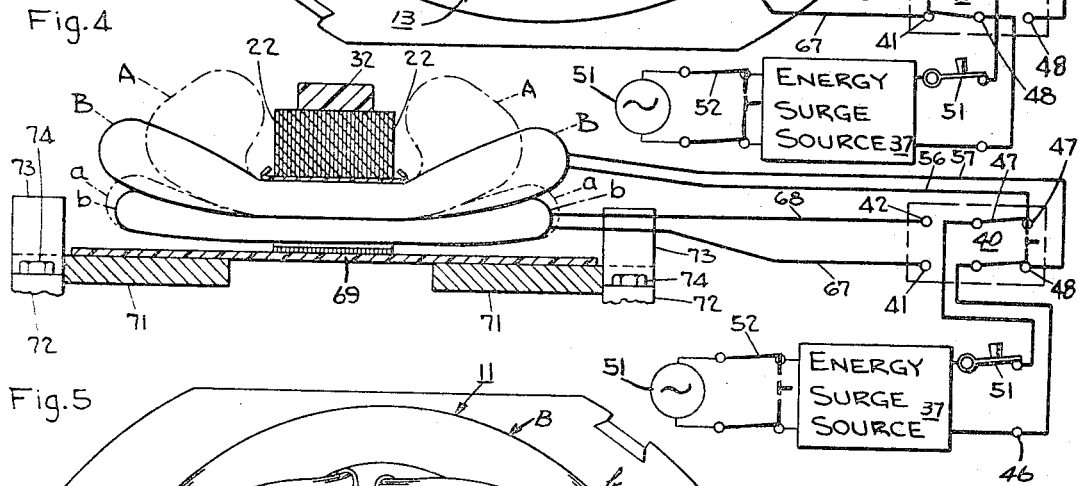
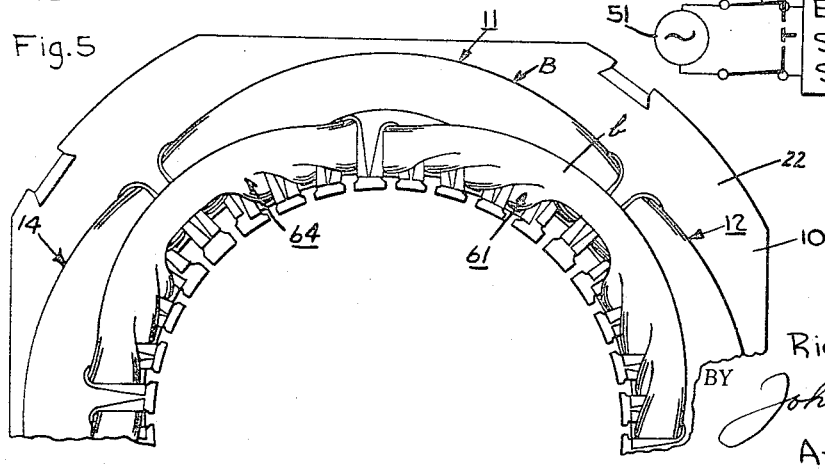
INVENTOR.
Richard D. Gibbs
BY John M. Stoudt
Attorney

United States Patent Office 3,407,483
Patented Oct. 29, 1968

3,407,483
PROCESS FOR ACHIEVING DESIRED POSITIONS OF ELECTRICAL COILS RELATIVE TO A MAGNETIC CORE
Richard D. Gibbs, Malta, Ill., assignor to General Electric Company, a corporation of New York
Filed July 28, 1966, Ser. No. 568,670
9 Claims. (Cl. 29—596)

This invention relates to an improved process for achieving desired positions of electrical coils relative to magnetic cores in the manufacture of inductive devices. In particular, it relates to an improved process especially suitable for effecting coil placing operations in magnetic cores during manufacture of members used in small and fractional dynamoelectric machines, such as stators, wound armatures, and the like.

In the manufacture of inductive devices which incorporate magnetic cores and electrical coils wound of a number of individually insulated conductor turns, it is quite desirable, if not essential, that the individual conductor turns in the side portions of the coils, which are carried by the slots, be pushed toward the bottom of the slot in a direction away from the slot entrances. It is also normally necessary to push back end turn portions of the coils, which are exposed adjacent associated end faces of the core, toward the end faces of the core. For example, in fractional horsepower and small induction motor stators it is necessary that the end turn portions of one set of winding coils be pushed back away from the bore of the stator toward the end faces to prevent obstruction of the bore, to shorten the axial dimension of the stator, and to permit additional sets of coils to be installed on the core.

Recent innovations in the manufacture of electrical devices now produce push back of side and end turn portions of the coils relative to the core by the utilization of electrical energy rather than the heretofore conventional mechanical approach which employed equipment for engaging the outer surfaces of the coils in an attempt to effect the necessary coil placing operation. The new and improved concepts disclosed in U. S. Patent Nos. 3,333,327; 3,333,328; 3,333,330; and 3,333,335, filed on Nov. 30, 1964, and assigned to the assignee of the present application, are typical of these recent innovations.

These innovations are particularly effective when used in the production of stators having a number of windings. For some applications where slot space factors of over 50% for the windings are provided by the winding operation, it is highly desirable to press back the individual turns of the first winding installed on the core, both in the slots and at the end turns, as far as possible in order to simplify the installation of the second winding inwardly of the first one. However, in order to accomplish this end, the position of the first winding end turns relative to the core will normally be too close to the associated core end faces for many stator applications and thus would have to be forced away from the core faces to the desired position. This is particularly difficult to obtain without disturbing to some degree the compaction effected in the end turn and side turn positions of the coils for at least the first winding. In addition, the problems are made even more complex in view of the inherent flexibility of the first winding turns and the tendency of the first winding end turns to oscillate rapidly and travel slightly beyond the position they finally assume. It is therefore highly desirable that an economical process be provided which achieves the above features quickly and efficiently. It is further desirable that the press back of the end turns relative to the core be provided in a manner which overcomes the difficulties mentioned above.

Accordingly, it is a primary object of the present invention to provide an improved process for achieving desired positions of electrical coils relative to a magnetic core, and more specifically, to provide an improved process especially suitable for effecting coil placing operations in the manufacture of inductive members used in small and fractional dynamoelectric machines.

It is another object of the present invention to provide an improved process for economically effecting coil placing operations in the manufacture of stators and the like having a number of windings which attains the features and overcomes the difficulties mentioned above.

In accordance with one form of the invention, I provide an improved process for effecting coil placing operations particularly suitable for manufacturing inductive members having two windings incorporated in small and fractional horsepower motors. Considering a stator core, a first winding is initially arranged in the slots in a closed path and placed in inductive coupled relation with a primary winding which is arranged in the bore of the core and connected in circuit to an electrical energy surge source. At least one surge of energy is supplied to the primary winding to induce current flow in the first winding. This in turn produces forces acting on the first winding to move the turns of the winding away from the bore, both in the slots and at the side faces of the core. While the turns in the slots are quite compact, the end turns are somewhat flared or partially compacted near the core end faces, with the type of end turn distribution tending to minimize end turn oscillation during their movement. This furnishes ample space, both in the slots, and radially beneath the end turns for additional coils.

Thereafter, the primary winding is removed from the bore, installed on the core, radially beneath the first winding, and the second winding is pushed firmly against the first winding, as by generating a surge of electrical energy in the second winding. Finally the end turns of the first and second windings are forced away from the core to the desired positions without detrimentally affecting the coil turn portions located in the slots by applying at least one surge of electrical energy to the first winding. This produces forces which act on that winding to move the end turns of both windings to the desired positions relative to the core. At the same time, the end turns of the first winding tend to bundle into a compact mass thereby reducing the space they occupy. To assist in the end turn movement, magnetic material is placed within the confines of the end turns adjacent the bore to furnish a positive path for flux and attract the end turns of the first winding as the surge flows through that winding.

This process is particularly effective in the manufacture of magnetic cores having windings installed by winding equipment adapted to provide relatively high slot space factors and simplifies the installation of additional coils on the core beneath those of the first winding. In addition, the desired positions of the winding end turns relative to the core are readily controlled without resort to dies or the like thereby reducing the cost of practicing the invention.

The subject matter which I regard as my invention is particularly pointed out and distinctly claimed in the concluding portion of this specification. My invention, however, both as to organization and method of operation, together with further objects and advantages thereof, may be best understood with reference to the following description taken in conjunction with the accompanying drawing in which:

FIGURE 1 is an end view of a stator core and a primary winding fixture of an electrical inductive apparatus for establishing an inductive coupled relationship with the coils of an excitation winding carried in the slots of the core having a closed electrical path, with the winding of the apparatus being connected in circuit with a pulsing circuit or an energy surge source for carrying out one step of the present invention;

FIGURE 2 is a partial end view of the magnetic core and coils shown in FIGURE 1 revealing the coil positions relative to the core after their initial press back has been accomplished;

FIGURE 3 is an end view, partially in diagrammatic form, of the stator core and excitation winding shown in FIGURES 1 and 2, the view showing the core having a second winding installed thereon radially beneath the first excitation winding, with the windings being adapted for selective connection to the energy surge source;

FIGURE 4 is a schematic cross sectional view of the stator and windings seen in FIGURE 3, with the winding positions being shown in phantom relative to the core and with the equipment for effecting the desired final placing operation of the coil end turns relative to the core being schematically presented; and FIGURE 5 is a partial end view of the core having the coils in the desired positions relative to the core, the view revealing the effectiveness of the present invention.

Having specific reference now to the figures, the preferred embodiment of the present invention is illustrated in connection with a four-pole dynamoelectric machine stator core 10 for use in a small or fractional horsepower single phase induction type electric motor. In the illustrative example, the first winding arranged in the slots of the core is a main excitation winding of the distributed type, having four identical coil groups 11, 12, 13, 14 each formed by three serially connected coils 16, 17, 18 (innermost to outermost) which are disposed symmetrically about central coil axis 19. Each of the coils in turn is wound of a predetermined number of enamel wire conductor turns formed of electrical conductive material; e.g., aluminum, copper, or the like, having relatively thin electrical insulation over the outer surfaces of the conductive material in the usual way.

This winding, prior to its transformation by the present invention, has side portions of the respective coils accommodated in slots 21 of the core, with the end turn portions projecting axially beyond the side faces 22 of the core in a generally axial direction. At this stage, the innermost turns of the coils are generally urged toward the bore 23 of the core formed by the terminations of the individual teeth sections 24 of the core with the end turns being rather loosely distributed. Conventional slot liners 26 electrically insulate the coil turn side portions from the walls of the slots. The winding and insertion operations which dispose the coils on the core in the illustrated manner may be accomplished in any suitable fashion, as by way of example the winding machine disclosed in U.S. Patent No. 2,836,204 issued to Lowell M. Mason on May 27, 1958.

Initially, I prefer to press back the end turn portions of the individual core groups toward the associated end face of the core as close to the end faces as possible in a partially compact bundle without having the radially outermost turns making contact with the core. In addition, the side portions of the coils in the slots are forced toward the bottom of the slots away from the bore into a compact mass (see FIGURE 2) by a procedure which produces little turn to turn voltage potential. Thus, any turns initially disposed near uninsulated walls of the core will not become grounded or incur injury, even when a relatively high initial surge of energy is utilized. In this regard I employ electrical inductive apparatus for producing an inductive coupling with the coil groups of the excitation winding carried by core 10 of the type disclosed in the aforementioned U.S. Patent No. 3,333,330. A primary winding, generally indicated at 31 and schematically shown in FIGURE 1, is held in a fixed or non-movable relation with respect to the stator core by suitable bracket means (not shown) as the core is rigidly supported, e.g., cradle bracket 32 and clamping element 33 removably secured together about core 10 by bolts 34. The primary winding is provided with magnetic poles that simulate the magnetic poles defined by the coil groups 11–14 inclusive of the excitation winding. In order to derive the most force with this arrangement, the magnetic pole centers of primary winding 31 and the main excitation winding are in radial alignment.

In the present exemplification primary winding 31 is connected to a suitable pulsing circuit or energy surge source 37 through a standard double-pole, double-throw switch 40. Primary winding leads 38, 39 are in circuit with stationary posts 41, 42 of switch 40 while posts 43, 44 of the movable switch blade 45 are connected to source terminals 46. The other pair of stationary posts 47, 48 are in open circuit. The surge source is in turn connected to a suitable source of power; e.g., alternating current source 51 through switch 52.

For purposes of explaining the present invention, energy surge source 37 will be assumed to be the same as that fully disclosed and described in the aforementioned U.S. Patent No. 3,333,330. After a closed path for induced current flow in the various coil groups of the excitation winding has been provided by making a good electrical connection of the winding terminations as indicated at 54, an electrical energy surge of the desired magnitude is applied to the primary winding 31 by closing a pulsing circuit actuating switch 55 which in turn actuates a circuit for charging a capacitor bank in the energy surge source to a selected voltage level as regulated by a variable autotransformer in the source. Thereafter, the capacitor bank discharges a surge of electrical energy into winding 31 as controlled by the voltage level on the capacitor bank.

With the excitation winding having a closed path or being short circuited and being inductively coupled to winding 31, induced current flow is generated through the excitation winding. Electromagnetic forces resulting from the interaction of the currents and magnetic field produced by the energy surge act on the coils of the excitation winding and effect the desired press back of the coils relative to the core. Since the excitation winding is short circuited, the turn to turn voltage is negligible and any turns initially near exposed walls of the core will be effectively transferred away from that wall without adversely affecting the insulation covering the wire or causing unduly high voltage stress between turns of the excitation coils.

To derive the maximum benefits from the present invention, the magnitude of the surge should be chosen such that it is below the intensity which deleteriously affects the coil insulation, yet sufficiently high to force the end turns as close to the associated core end faces as possible without actually touching the faces, position A in FIGURES 2 and 4. This not only provides an unusually tight bundle of side turn portions in the slots away from the bore, but in addition furnishes slightly compacted and flared end turn portions bent back from the bore in the manner accurately depicted in FIGURE 2 and slightly exaggerated in FIGURE 4. With respect to both the slots and end faces of the core there is an unobstructed opening and more than sufficient space within the confines of the first winding for installing the second winding.

At this time, the primary winding 31 is removed from the bore of the core and disconnected from switch 40. An auxiliary or second winding is then placed into the slots of the core, radially inwardly of the first winding in angularly phase relation therewith. As shown in FIGURE 3, in the exemplification the auxiliary winding is comprised of four concentric coil groups 61, 62, 63, 64 having their radial polar centers 90 electrical degrees from the polar centers 19 of the first winding coil groups. Coil groups 61 and 63 contain a total of four coils each while the alternate coil groups 62 and 64 include three concentrically arranged coils, a conventional coil deployment.

Once the coil groups of the second winding have been installed onto the core, they are preferably forced back to position a shown in phantom in FIGURE 4 in any convenient fashion, slot wedges (not shown) inserted in the slots beneath the coil side portions next to the bore, and finally the end turns of the first winding are moved away from the associated core end faces to the desired position B (FIGURES 4, 5) as the end turns are compacted into a tight bundle of turns. During this press back, the turns of the first winding, which face the radially outermost turns of the second winding, will press firmly against the second winding end turns and tend to force it into the desired position b. Since the end turns of the second winding will resist this movement, it will tend to become even more compact if possible.

The foregoing may readily be accomplished by using any suitable electrical apparatus. For example, as shown in FIGURE 3 coil terminations 67, 68 of the second winding are connected to posts 41, 42 of switch 40 and a closed circuit made between these posts and terminals 46 of the energy surge source 37. Closing switch 55 initiates operation of the energy source 37 and a preselected surge of energy may be injected into the coils of the auxiliary winding to transfer the coils to position a (FIGURE 4). If desired, a tubular piece of insulating material 69 may be employed to retain the turns of the second winding in the slots from the winding operation until press back of the turns has been accomplished. The slot wedges may then be inserted into the slots after the auxiliary winding has been pressed back into position as shown in FIGURE 4 since it is relatively simple at this stage to insert the wedges into the individual slots adjacent the slot entrance at the bore.

It will be recalled that after the second winding has assumed position a relative to the core, the end turn portions of the first winding are driven away from the associated end faces 22 of the core as shown schematically in FIGURE 4 into the final position B. This in turn forces the end turn portions of the second winding slightly toward the bore into position b. In order to accomplish this final placing operation, I positioned ferrous material 71 radially beneath the end turns of the auxiliary winding and apply or inject a surge of electrical energy of a preselected magnitude into the coils of the main winding. This establishes current flow through coil groups 11–14, and creates forces which act upon the end turns of the main winding to move them away from the associated end face 22 of the core and towards ferrous material 71 which attracts the turns and acts as a positive flux path as the current surge is being generated in the main winding. During this action, the forces in the slots are such as to maintain or even augment the compactness obtained in the slots of the coil side portions for the main winding during the previous steps. The energy level should be sufficiently high to effect the desired coil placement, yet below that which deleteriously affects the insulation covering the first winding.

In order to carry out this step, winding terminations 57, 58 of the first winding are connected to posts 47, 48 of switch 40, with the movable switch blade 45 closing the circuit between the energy surge source terminals 46. Posts 41, 42 connected to the second winding will thus be in open circuit. Magnetic or ferrous material 71 may be in any suitable form, either laminated or solid, and in the example, is a cylinder suitably supported radially inward of the end turns by a cradle 72 and a removable bracket 73 attached thereto by bolt 74. Consequently, with the apparatus core and coils having the relationships shown in FIGURE 4, the energy surge may be injected into coil groups 11–14 by closing switch 55 which actuates the energy surge source 37 in a manner similar to that described in connection with FIGURE 1.

For the purpose of more clearly illustrating how the method embodying one form of my invention as described above has been satisfactorily carried out in actual practice, I will set forth a specific example without intending to limit the invention to that example. A number of stator cores were constructed with the overall shape best shown in FIGURE 3. The cores had the following nominal dimensions: bored diameter, 3.48 inches; corner to corner diameter, 6.29 inches; across flats, 5.4 inches; and stack height, 0.9 inch; coil groups 11–14 were wound of aluminum wire of 0.0453 inch diameter having a polyvinyl formal type resin coating. Each pole had 26, 34, 38 turns (innermost to outermost coil) and a total resistance of 2.18–2.42 ohms. The auxiliary windings were wound of aluminum wire having a 0.0269 inch diameter, a polyvinyl formal type resin coating. Two poles had 11, 15, 17, and 20 turns while the other two poles had 11, 15, and 19 turns, innermost to outermost coil, with a resistance of 3.27–3.74 ohms. The stators were of the type customarily incorporated in ⅙ horsepower single phase electric motors rated at 115 volt, 415 amps, and 60 cycles per second.

The pulsing circuit was of the type more fully disclosed in U.S. Patent No. 3,333,330 and had a capacitor bank rated at 410 microfarads. With the main winding providing a closed electrical path and primary winding 31 inductively coupled to it, in one application for a stator the bank was charged to a voltage level of 1,800 volts and thereafter discharged into winding 31, the surge duration lasting approximately six microseconds, with peak amperage of 8,000 appearing at 3.5 microseconds. This pressed back the coil turns in the slots and the end turns to position A where they had a total maximum dimension across of 5⅝ inches.

After the auxiliary winding was installed and forced back against the main winding, the capacitor bank was charged to 2,000 volts and thereafter discharged into the main winding coils. During this step, a solid cylinder formed of ferrous material was inserted entirely through the core, beyond the axial limits of the end turns. The surge was of 6 milliseconds duration, peaking in 2 milliseconds at slightly over 300 amperes. This reduced coil placement of the main winding end turns to an outer diameter of 4⅝ inches, with the end turn portions becoming a compacted mass in the manner shown in FIGURES 4 and 5. Even though the solid cylinder of ferrous material extended entirely through the bore of the core and was near the side turn portions of the auxiliary winding, no appreciable effect was observed in separating the compact bundles of coil turns in the slots. However, best results in regard to retaining compaction of the turns in the slots are obtained by maintaining the bore free from ferrous material. It should be noted that the magnitude of the surge, the type and size of windings and core are the more important factors which will determine the final positions for the windings relative to the core. However, these are readily determined and accurate positioning of the end turns is easily attained without need of dies or the like. A 2,000 volt high potential test in accordance with NEMA standard MG 1—12.03 and a 3,000 volt repetitive surge test (NEMA standard MG 1—12.05) were performed on the stator with completely satisfactory results.

Thus, it will be appreciated from the foregoing that in spite of the fact that the end turn portions normally have a tendency during their press back to oscillate rapidly, a desired position relative to the core may be achieved with a high degree of accuracy without need for dies or other equipment for limiting movement of the end turns. At the same time compaction of the coils, both in the slots and adjacent the core end faces, is readily obtained for all the coils. In addition, by this procedure an unusually large space is provided within the confines of the first winding end turn portions so that it is relatively simple to install additional coils into the slots of the core. The foregoing desirable features are achieved by a versatile procedure which is readily adaptable in the efficient mass production manufacture of electrical inductive devices, and especially small and fractional horsepower dynamoelectric machine members.

While only certain preferred features of my invention have been shown herein in connection with a dynamoelectric machine stator, it will be appreciated that my invention has application to the manufacture of other inductive devices and that changes and modifications may be made by those skilled in the art without departing from the true scope and spirit of my invention. It is therefore to be understood that the appended claims are intended to cover all equivalent variations as fall within the invention.

What I claim as new and desire to secure by Letters Patent of the United States is:

1. A process for achieving desired positions of first and second electrical windings carried in open ended slots of a magnetic stator core which terminate at a pair of core end faces radially outward from a bore, the process comprising the steps of: arranging the first electrical winding, including a plurality of coils wound of conductor turns, in inductive coupled relationship with winding means disposed in the bore, the plurality of coils having side portions accommodated in slots of the stator core and end portions respectively projecting beyond the end faces; applying at least one surge of electrical energy to the winding means as the coils of the first winding are short circuited to induce current flow in said coils and produce forces acting thereon for causing movement of the coil end turn portions away from the winding means; removing the winding means from the bore and disposing coil side portions of a second winding in slots of the core, with coil end turn portions of the second winding being located radially beneath the end turn portions of the first winding end turn portions; and applying at least one surge of electrical energy to the first winding to produce forces acting on the end turn portions thereof for moving the end turn portions in the direction of the bore and into the desired position relative to the core.

2. The process of claim 1 in which during the movement of the first winding end turn portions toward the desired position, they force movement of at least some of the end turn portions of the second winding in the same direction.

3. The process of claim 1 in which electrically conductive magnetic material is positioned radially beneath the end turn portions of the second winding adjacent at least one side of the bore for attracting the end turn portions of the first winding and augmenting movement thereof into the desired position relative to the core.

4. The process of claim 1 in which the coils of the second winding are placed in angularly spaced relation with respect to the coils of the first winding when the side portions of the second winding are disposed in the core slots to provide a spacial phase shift between the two windings.

5. A process for achieving desired position of at least one electrical coil relative to a slotted magnetic core, with coil side portions being disposed in slots of the core and coil end turn portions projecting beyond core end faces, the process comprising the steps of: placing electrically conductive magnetic material adjacent at least one selected end turn portion; and moving the selected end turn portion away from the associated core end face toward the magnetic material by generating at least one surge of electrical energy in the electrical coil to create electromagnetic forces acting thereon to produce movement of the coil into the desired position, with the magnetic material assisting in such movement.

6. The process of claim 5 in which the core is a stator core having a bore and the magnetic material is maintained adjacent the bore beneath the selected end turn portion as the portion is being moved into the desired position.

7. A process for achieving a desired position of at least one winding relative to a slotted magnetic core, with the winding including one or more electrical coils having side portions carried in slots of the core and end turn portions extending beyond the slots, the process comprising the steps: moving selected end turn portion from one to another position relative to the core by generating at least one surge of electrical current flow through the selected end turn portion of sufficient magnitude for creating forces acting thereon to produce the movement; disposing coil side portions of at least one coil of another winding in the slots, with end turn portions thereof being arranged adjacent the end turn portions of the one winding; and moving the selected end turn portion in a direction opposite from said another position to the desired position by generating at least one surge of electrical energy therein of sufficient magnitude to create forces acting thereon to produce the desired movement.

8. The process of claim 7 in which during movement of the selected end turn portion from the one to another position, the selected end turn portion is short circuited and in inductive coupled relationship with conductor means and at least one surge of electrical energy is applied to the conductor means for generating current flow in the selected end turn portion.

9. The process of claim 8 in which during the movement of the selected end turn portion from the another position to said desired position, electrically conductive magnetic material is maintained adjacent the end turn portions of the another winding to assist in such movement and the selected end turn portion forces the end turn portions of the second winding toward the magnetic material.

References Cited

UNITED STATES PATENTS

| | | | |
|---|---|---|---|
| 3,333,327 | 8/1967 | Larsen | 29—596 |
| 3,333,328 | 8/1967 | Rushing | 29—596 |
| 3,333,329 | 8/1967 | Linkous | 29—596 |
| 3,333,330 | 8/1967 | Linkous | 29—596 |
| 3,333,335 | 8/1967 | Sims | 29—596 X |
| 3,353,251 | 11/1967 | Linkous | 29—205 |

JOHN F. CAMPBELL, *Primary Examiner.*

J. CLINE, *Assistant Examiner.*